(12) United States Patent
Kida et al.

(10) Patent No.: US 11,294,525 B2
(45) Date of Patent: Apr. 5, 2022

(54) TOUCH PANEL AND DISPLAY DEVICE

(71) Applicant: SHARP KABUSHIKI KAISHA, Osaka (JP)

(72) Inventors: Kazutoshi Kida, Sakai (JP); Takenori Maruyama, Sakai (JP); Takuma Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/152,704

(22) Filed: Jan. 19, 2021

(65) Prior Publication Data

US 2021/0255737 A1 Aug. 19, 2021

(30) Foreign Application Priority Data

Feb. 13, 2020 (JP) .............................. JP2020-022390

(51) Int. Cl.
*G06F 3/044* (2006.01)

(52) U.S. Cl.
CPC .. *G06F 3/0446* (2019.05); *G06F 2203/04105* (2013.01); *G06F 2203/04112* (2013.01)

(58) Field of Classification Search
CPC ......... G06F 3/0446; G06F 2203/04105; G06F 2203/04112
See application file for complete search history.

(56) References Cited

U.S. PATENT DOCUMENTS

| | | | | |
|---|---|---|---|---|
| 9,057,653 B2* | 6/2015 | Schediwy | ............... | G01L 1/146 |
| 9,671,915 B2* | 6/2017 | Shepelev | ............ | G06F 3/04164 |
| 10,133,380 B2* | 11/2018 | Shih | ...................... | G06F 3/0446 |
| 10,444,893 B2* | 10/2019 | Kitada | ................. | G06F 3/04166 |
| 10,627,934 B2* | 4/2020 | Ding | ..................... | G06F 3/0412 |
| 10,775,889 B1* | 9/2020 | Lehmann | ............ | G06F 3/03547 |
| 2008/0018611 A1* | 1/2008 | Serban | ................. | H03K 17/975 |
| | | | | 345/173 |
| 2010/0283752 A1* | 11/2010 | Maeda | ................ | G06F 3/04166 |
| | | | | 345/173 |
| 2011/0057899 A1* | 3/2011 | Sleeman | ................. | G01L 1/146 |
| | | | | 345/174 |
| 2011/0157087 A1* | 6/2011 | Kanehira | .............. | G06F 3/0447 |
| | | | | 345/174 |
| 2013/0033450 A1* | 2/2013 | Coulson | ................ | G06F 3/0446 |
| | | | | 345/174 |
| 2014/0062933 A1 | 3/2014 | Coulson et al. | | |
| 2014/0062934 A1* | 3/2014 | Coulson | ................ | G06F 3/0445 |
| | | | | 345/174 |

(Continued)

FOREIGN PATENT DOCUMENTS

JP 2016-126336 A 7/2016

*Primary Examiner* — Amy Onyekaba
(74) *Attorney, Agent, or Firm* — ScienBiziP, P.C.

(57) ABSTRACT touch panel includes a first substrate including a first surface, a second substrate including a second surface opposite to the first surface, a drive electrode formed on the first surface, and a position sense electrode, a pressing force sense electrode, and a shield electrode that are formed on the second surface. The shield electrode is disposed between the position sense electrode and the pressing force sense electrode, and, in a plan view when viewing the second substrate from the first substrate, the drive electrode covers at least a portion of the pressing force sense electrode, and at least a portion of an end portion of the drive electrode is positioned above the shield electrode.

12 Claims, 12 Drawing Sheets

(56) References Cited

U.S. PATENT DOCUMENTS

| | | | |
|---|---|---|---|
| 2015/0212633 A1* | 7/2015 | Yamagishi | G06F 3/045 |
| | | | 345/174 |
| 2016/0187690 A1 | 6/2016 | Nam et al. | |
| 2016/0306481 A1* | 10/2016 | Filiz | G06F 3/04144 |
| 2016/0357331 A1* | 12/2016 | Kano | G06F 3/0446 |
| 2016/0363797 A1* | 12/2016 | Kimura | G02F 1/13338 |
| 2016/0364082 A1* | 12/2016 | Kimura | G02F 1/133345 |
| 2017/0038877 A1* | 2/2017 | Kuboyama | G06F 1/163 |
| 2017/0038878 A1* | 2/2017 | Lin | G06F 3/0443 |
| 2017/0045992 A1* | 2/2017 | Lee | G06F 3/04166 |
| 2017/0115768 A1* | 4/2017 | Shih | G06F 3/0412 |
| 2017/0160863 A1* | 6/2017 | Suzuki | G06F 3/0443 |
| 2017/0269748 A1* | 9/2017 | Ding | G06F 3/0448 |
| 2017/0277300 A1* | 9/2017 | Kurasawa | G06F 3/0446 |
| 2017/0300166 A1* | 10/2017 | Rosenberg | G06F 3/04166 |
| 2017/0322659 A1* | 11/2017 | Hu | G06F 1/1626 |
| 2018/0088722 A1* | 3/2018 | Kim | G06F 3/0447 |
| 2018/0166507 A1* | 6/2018 | Hwang | H01L 27/3272 |
| 2018/0314331 A1* | 11/2018 | Doll | G06F 1/1626 |
| 2018/0348904 A1* | 12/2018 | Noma | G06F 3/0443 |
| 2018/0364511 A1* | 12/2018 | Kagawa | H01L 27/124 |
| 2019/0064965 A1* | 2/2019 | Yoon | G06F 3/0446 |
| 2019/0138125 A1* | 5/2019 | Zeng | G06F 3/044 |
| 2019/0204958 A1* | 7/2019 | Oh | G06F 3/044 |
| 2020/0209085 A1* | 7/2020 | Wettels | G01L 1/205 |
| 2020/0397321 A1* | 12/2020 | Dirksen | G01L 9/0073 |
| 2021/0247873 A1* | 8/2021 | Miyahara | G06F 3/0446 |

\* cited by examiner

TOUCH PANEL AND DISPLAY DEVICE

CROSS-REFERENCE TO RELATED APPLICATIONS

This application claims the benefit of priority to Japanese Patent Application No. 2020-022390 filed on Feb. 13, 2020. The entire contents of the above-identified application are hereby incorporated by reference.

BACKGROUND

Technical Field

The disclosure relates to a touch panel that can detect a position of a pointer such as a finger or a touch pen and magnitude of pressing force and a display device provided with the touch panel.

In recent years, mutual-capacitive touch panels have been in wide use. The mutual-capacitive touch panel includes a drive electrode to which a drive signal is input and a sense electrode. In this touch panel, in a case where a pointer is capacitively coupled with each of the drive electrode and the sense electrode, electrostatic capacitance between both the electrodes decreases, and a signal at the sense electrode changes. A position of the pointer is detected on the basis of the change in the signal at the sense electrode.

In addition, in U.S. 2014/0062933 A, a touch panel is proposed in which not only a position of the pointer, but also magnitude of pressing force can be detected. The touch panel is provided with, in addition to a position sense electrode for detecting the position of the pointer, a pressing force sense electrode for detecting the magnitude of the pressing force by the pointer. Furthermore, the position sense electrode and the pressing force sense electrode are formed on she same surface, and a drive electrode is formed on a surface opposite to them. In such a touch panel, in a case where a distance between the drive electrode and the pressing force sense electrode is reduced in response to the pointer pressing the touch panel, electrostatic capacitance between these electrodes increases, and a signal at the pressing force sense electrode changes. The magnitude of the pressing force is detected on she basis of the change in the signal at the pressing force sense electrode.

SUMMARY

In a case where the touch panel described in U.S. 2014/0062933 A is pressed by the pointer, the distance between the drive electrode and the pressing force sense electrode is reduced, and a distance between the drive electrode and the position sense electrode is also reduced. As a result, electrostatic capacitance between the drive electrode and the position sense electrode increases, and a decrease in the electrostatic capacitance caused by the capacitive coupling with the pointer is cancelled out, thereby decreasing detection accuracy of the position of the pointer.

In the case of the touch panel described in U.S. 2014/0062933 A, the pointer is capacitively coupled with each of the drive electrode and the pressing force sense electrode, and the electrostatic capacitance between both the electrodes fluctuates. As described above, the magnitude of the pressing force is detected on the basis of the magnitude of the electrostatic capacitance in accordance with the distance between the drive electrode and the pressing force sense electrode. Therefore, in a case where the pointer causes the electrostatic capacitance between the drive electrode and the pressing force sense electrode to fluctuate, the detection accuracy of the magnitude of the pressing force decreases.

Accordingly, an object of the disclosure is to provide a touch panel that can detect a position of a pointer and magnitude of pressing force with great accuracy and a display device provided with the touch panel.

To solve the above problem, a touch panel according to an embodiment of she disclosure includes a first substrate including a first surface, a second substrate including a second surface opposite to the first surface, a drive electrode formed on the first surface, and a position sense electrode, a pressing force sense electrode, and a shield electrode that are formed on the second surface. The shield electrode is disposed between the position sense electrode and the pressing force sense electrode, and, in a plan view when viewing the second substrate from the first substrate, the drive electrode covers at least a portion of the pressing force sense electrode, and at least a portion of an end portion of the drive electrode is positioned above the shield electrode.

The touch panel having the configuration described above includes the shield electrode, and the shield electrode can inhibit capacitive coupling that causes a decrease in detection accuracy of a position of the pointer and magnitude of pressing force. Accordingly, the touch panel having the above-described configuration can accurately detect the position of the pointer and the magnitude of the pressing force.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments of the disclosure will be described in detail with reference to the drawings. In the drawings, identical or corresponding parts are denoted by the same reference signs, and the description thereof will not be repeated. Note that, for ease of explanation, in the drawings referred to below, the configuration is simplified or schematically illustrated, or some of the components are omitted. Also, the dimensional ratios between the components illustrated in the drawings are not necessarily indicative of actual dimensional ratios. In addition, in the drawings referred to below, various electrodes are displayed with hatching in order to facilitate identification of the various electrodes.

First Embodiment

Figure 1:
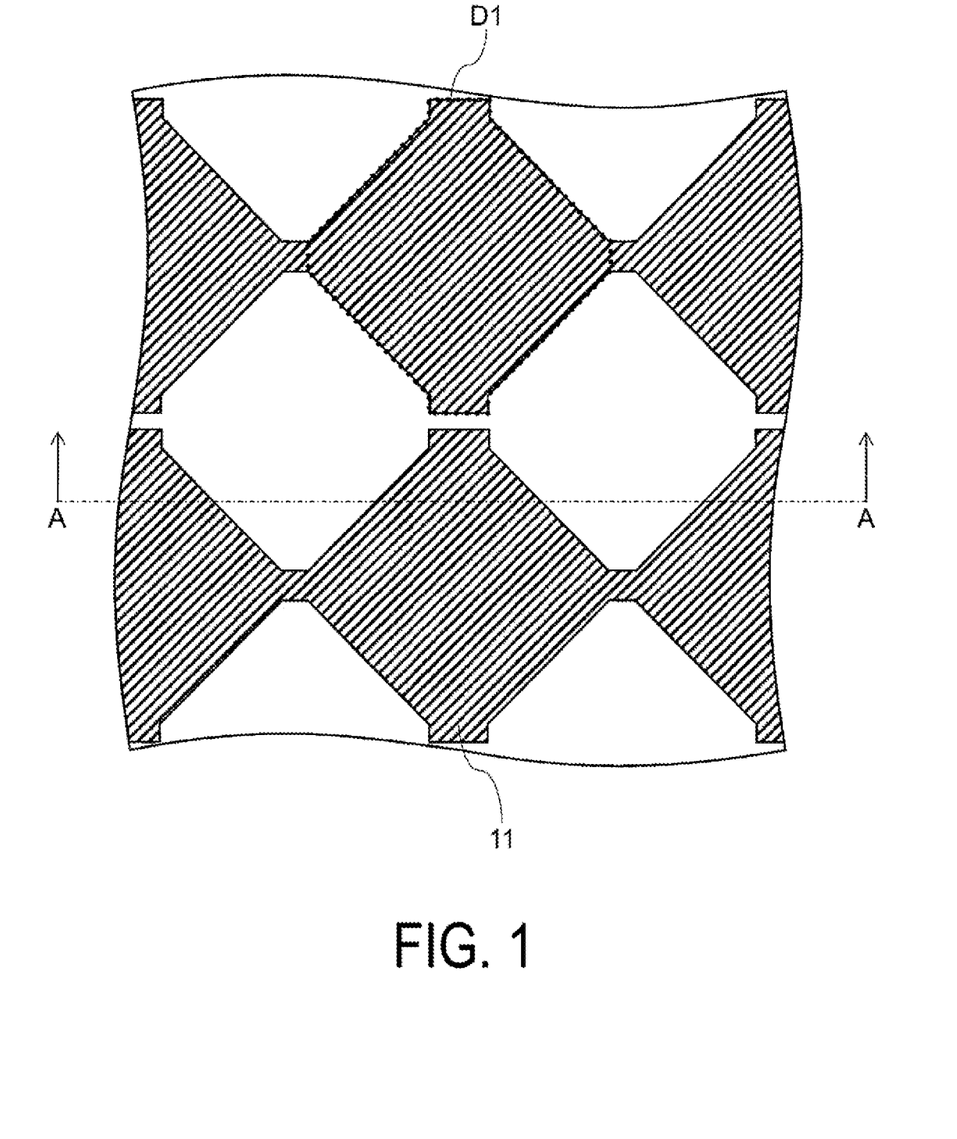
FIG. 1 is a plan view illustrating a configuration of as electrode included is a touch panel 1 according to a first embodiment.
Figure 2:
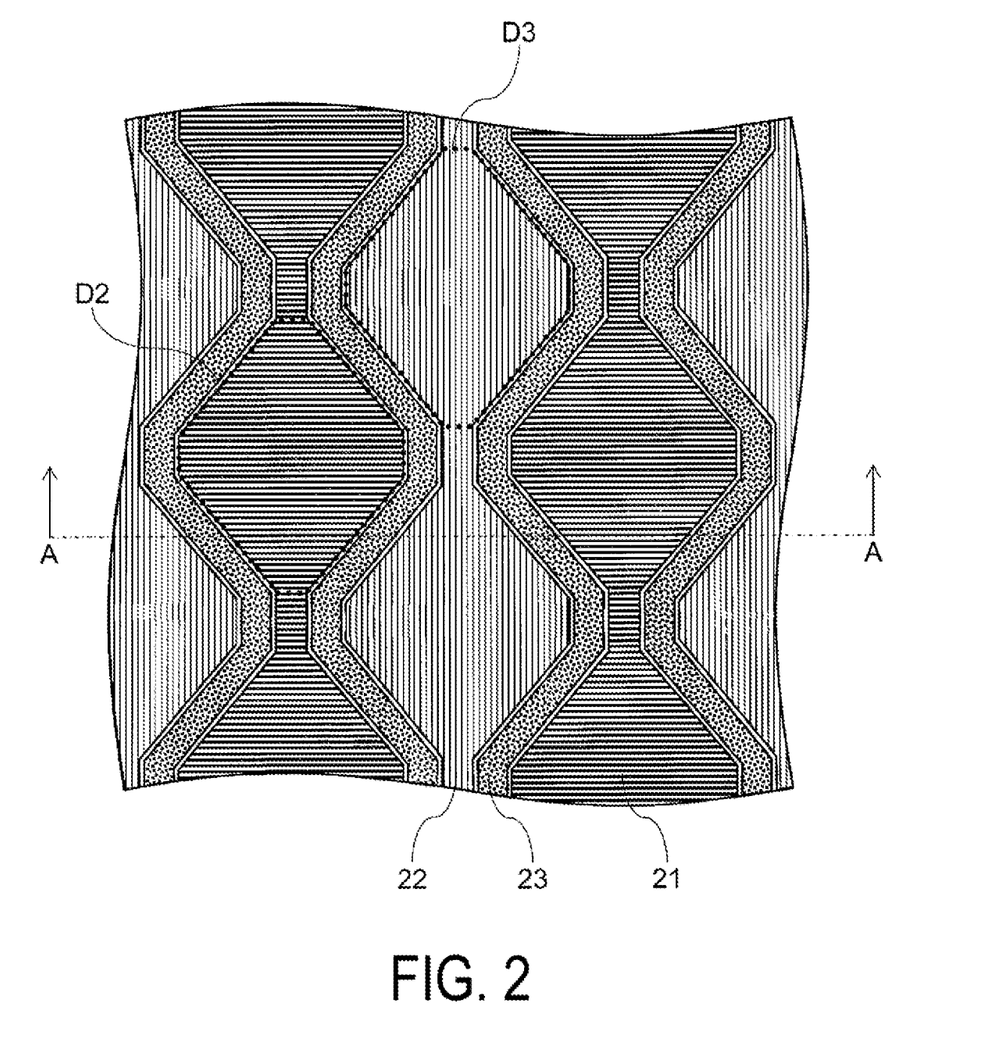
FIG. 2 is a plan view illustrating a configuration of an electrode included in the touch panel 1 according to the first embodiment.
Figure 3:
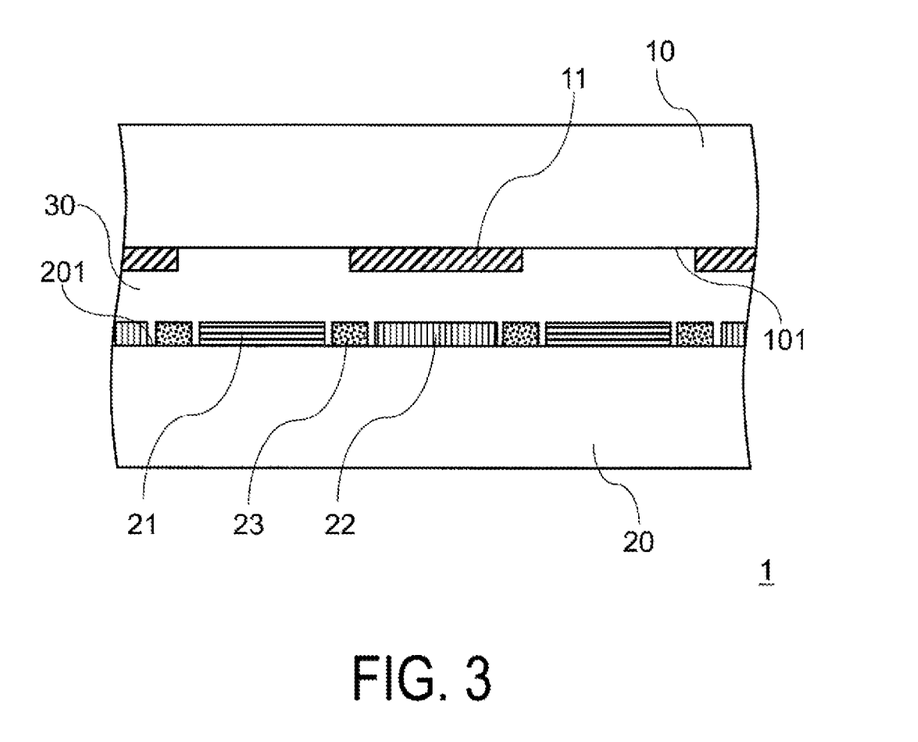
FIG. 3 is a cross-sectional view illustrating a cross section taken along a line A-A in FIGS. 1 and 2.

FIGS. 1 to 3 are views illustrating a schematic configuration of a touch panel 1 according to the first embodiment. FIGS. 1 and 2 are plan views illustrating configurations of electrodes included in the touch panel 1 according to the first embodiment. FIG. 3 is a cross-sectional view illustrating a cross section taken along a line A-A of FIGS. 1 and 2. Note that for the sake of convenience in illustration, the electrodes included in the touch panel 1 are illustrated separately in FIGS. 1 and 2; however, as illustrated in FIG. 3, the electrodes illustrated in FIGS. 1 and 2 are layered.

As illustrated in FIG. 3, the touch panel 1 includes a first substrate 10, a drive electrode 11, a second substrate 20, a position sense electrode 21, a pressing force sense electrode 22, a shield electrode 23, and a dielectric layer 30. For example, the first substrate 10 and the second substrate 20 are each made of a transparent material such as glass. In addition, the position sense electrode 21, the pressing force sense electrode 22, and the shield electrode 23 are each made of an electrically conductive transparent material such as Indium Tin Oxide (ITO). The dielectric layer 30 is made of a transparent material having elasticity such as a polymer material.

The first substrate 10 and she second substrate 20 are disposed such that a first surface 101 of the first substrate 10 and a second surface 201 of the second substrate 20 are opposite to each other. The drive electrode 11 is an electrode to which a drive signal is provided and is formed on the first surface 101. The position sense electrode 21 is an electrode for detecting the position of a pointer and is formed on the second surface 201. The pressing force sense electrode 22 is an electrode for detecting the magnitude of the pressing force by the pointer and is formed on the second surface 201. The shield electrode 23 is provided with a potential equal to the around potential or a potential provided to the position sense electrode 21 or the pressing force sense electrode 22 or is in a floating state, and is formed on the second surface 201.

As illustrated in FIGS. 1 and 2, the drive electrode 11 has a shape (diamond pattern) in which a plurality of rhombus-shaped electrodes D1 are connected in a diagonal direction thereof. Similarly, the position sense electrode 21 has a diamond pattern in which a plurality of rhombus-shaped electrodes D2 are connected. In addition, the pressing force sense electrode 22 has a diamond pattern in which a plurality of rhombus-shaped electrodes D3 are connected. A connecting direction in which the rhombus-shaped electrodes D2 of the position sense electrode 21 are connected and a connecting direction in which the rhombus-shaped electrodes D3 of the pressing force sense electrode 22 are connected are parallel to each other, and the position sense electrode 21 and the pressing force sense electrode 22 are alternatively disposed with respect to a direction perpendicular to the connecting directions. Meanwhile, the drive electrode 11 is disposed such that a connecting direction of the rhombus-shaped electrodes D1 is perpendicular to each of the connecting directions of the rhombus-shaped electrodes D2, D3 of the position sense electrode 21 and the pressing force sense electrode 22.

As illustrated in FIGS. 2 and 3, the shield electrode 23 is disposed between the position sense electrode 21 and the pressing force sense electrode 22. For example, the shield electrode 23 is disposed between the position sense electrode 21 and the pressing force sense electrode 22 to separate them from each other.

In a plan view when viewing the second substrate 20 from the first substrate 10 (hereinafter, simply referred to as a "plan view"), the drive electrode 11 covers at least a portion of the pressing force sense electrode 22. Additionally, in a plan view, at least a portion of an end portion of the drive electrode 11 is positioned above the shield electrode 23. Note that in the touch panel 1 exemplified in FIGS. 1 to 3, in a plan view, one rhombus-shaped electrode D1 constituting the drive electrode 11 contains one rhombus-shaped electrode D3 constituting the pressing force sense electrode 22.

Figure 4:
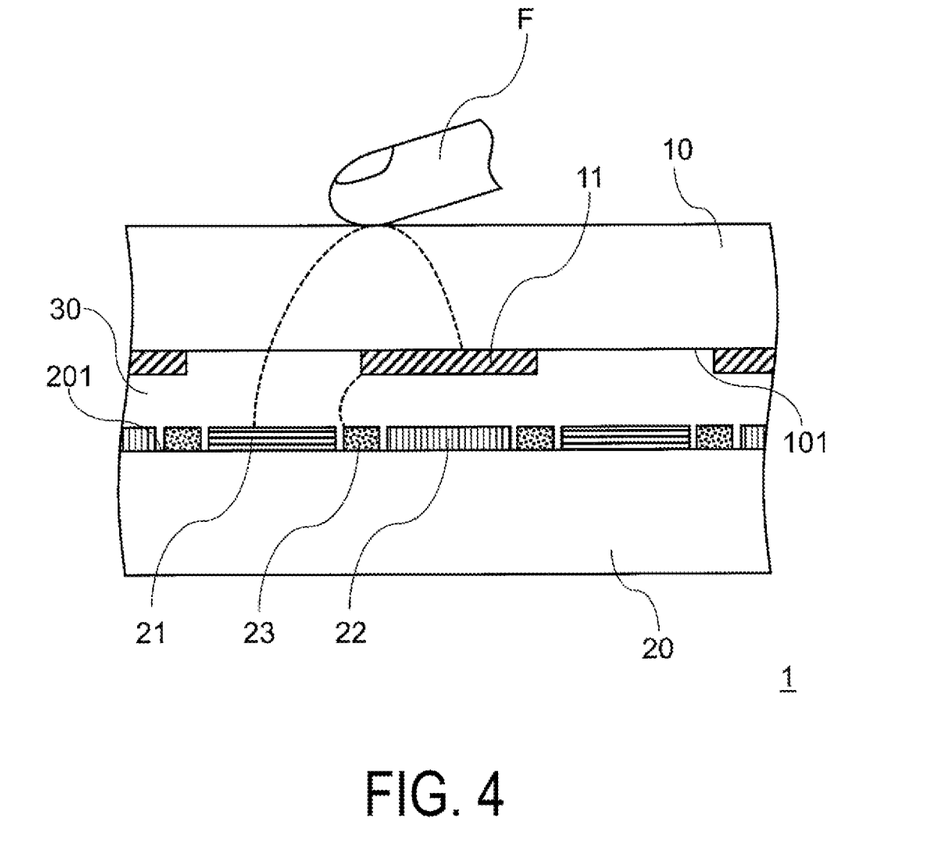
FIG. 4 is a cross-sectional view illustrating capacitive coupling with respect to the detection accuracy of a position sense electrode 21.
Figure 5:
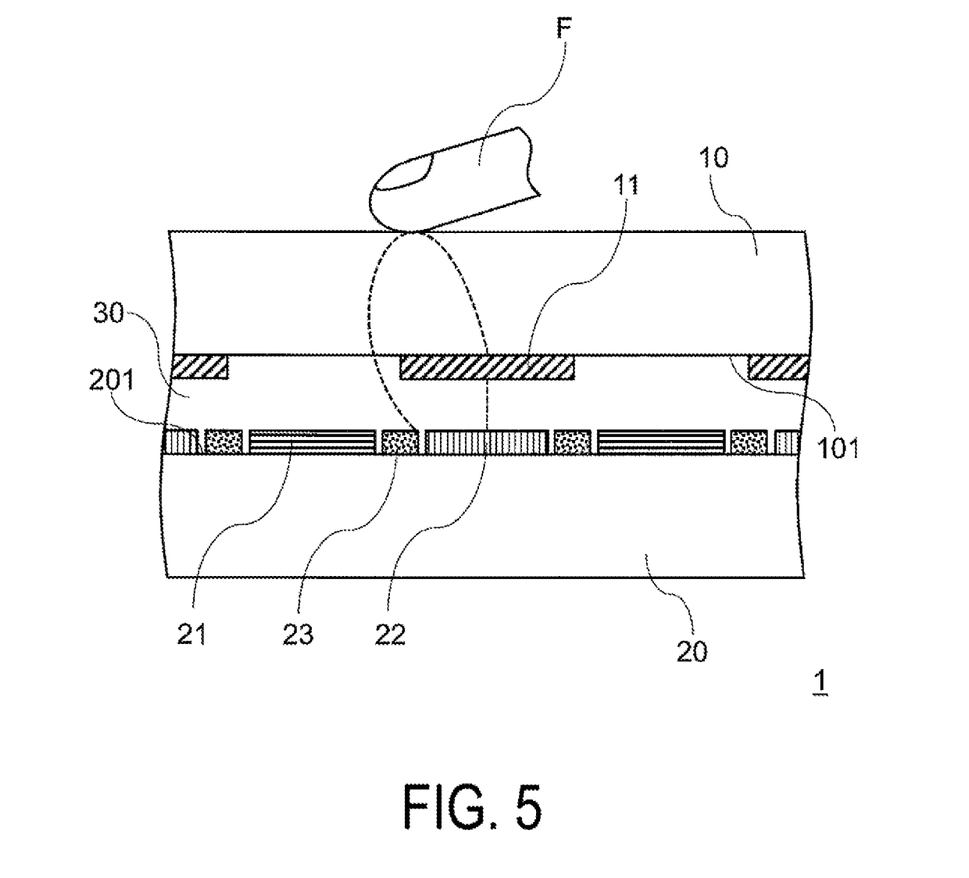
FIG. 5 is a cross-sectional view illustrating capacitive coupling with respect to the detection accuracy of a pressing force sense electrode 22.

Next, operation of the touch panel 1 will be described with reference to the drawings. FIG. 4 is a cross-sectional view illustrating capacitive coupling with respect to the detection accuracy of the position sense electrode. FIG. 5 is a cross-sectional view illustrating capacitive coupling with respect to the detection accuracy of she pressing force sense electrode. In FIGS. 4 and 5, electrical lines of force corresponding to capacitive coupling generated between the pointer F and the various electrodes and capacitive coupling generated between the various electrodes are indicated by dashed lines.

As illustrated in FIG. 4, the pointer F is capacitively coupled with each of the drive electrode 11 and the position sense electrode 21 in response to the pointer F coming into contact with a surface of the first substrate 10 located opposite the first surface 101. This results in a decrease in the electrostatic capacitance between the drive electrode 11 and the position sense electrode 21 due to the pointer F and results in a change in a signal detected at the position sense electrode 21. This change in the signal allows the position of the pointer F to be detected.

At this time, the distance between the drive electrode 11 and the position sense electrode 21 is reduced in response to the pointer F pressing the first substrate 10. However, since the drive electrode 11 is closer to the shield electrode 23 than the position sense electrode 21, the drive electrode 11 is likely to be capacitively coupled with the shield electrode 23. As a result, the electrostatic capacitance between the drive electrode 11 and the position sense electrode 21 is less likely to increase, and she decrease in electrostatic capacitance between both the electrodes 11 and 21 due to the pointer F is less likely to be cancelled out. Accordingly, the touch panel 1 can accurately detect the position of the pointer F.

In addition, as illustrated in FIG. 5, the distance between the drive electrode 11 and the pressing force sense electrode 22 is reduced in response to the pointer F pressing the first substrate 10. This results in an increase in the electrostatic capacitance between both the electrodes 11 and 22 and results in a change in a signal detected at the pressing force sense electrode 22. This change in the signal allows the magnitude of the pressing force to be detected.

At this time, since the pointer F is closer to the shield electrode 23 than the pressing force sense electrode 22 on the route from the pointer F to the pressing force sense electrode 22, the pointer F is likely to be capacitively coupled with the shield electrode 23. This suppresses the pointer F from being capacitively coupled with each of the drive electrode 11 and the pressing force sense electrode 22 and the electrostatic capacitance between both the electrodes from fluctuating. Accordingly, the touch panel 1 can accurately detect the magnitude of the pressing force.

As described above, the touch panel 1 includes the shield electrode 23, and the shield electrode 23 can inhibit the capacitive coupling that causes a decrease in she detection accuracy of the position of the pointer F and the magnitude of the pressing force. Accordingly, the touch panel 1 can accurately detect the position of the pointer F and the magnitude of the pressing force.

Note that a configuration is possible in which a potential of the shield electrode 23 is equal to the ground potential or a potential provided to the position sense electrode 21 or she pressing force sense electrode 22. In this case, the effect of the shield electrode 23 inhibiting the capacitive coupling described above can be increased.

Figure 6:
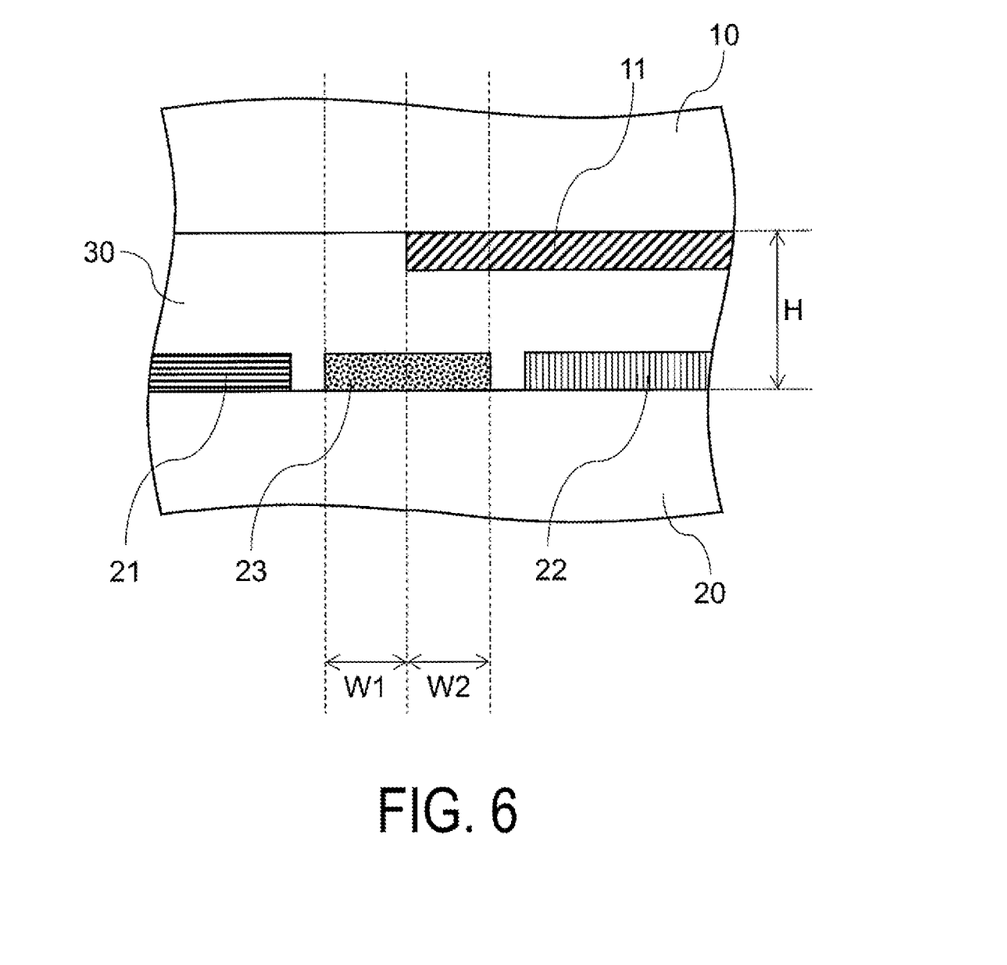
FIG. 6 is a cross-sectional view for describing a suitable size of a shield electrode 23.

In addition, from the standpoint of increasing the effect of the shield electrode 23 inhibiting the capacitive coupling described above, the shield electrode 23 is preferably made larger to a predetermined degree. FIG. 6 is a cross-sectional view for describing a suitable size of the shield electrode 23. Hereinafter, as illustrated in FIG. 6, H is the distance between the first surface 101 of the first substrate 10 and the second surface 201 of the second substrate 20. W1 is a distance from an end portion of the shield electrode 23 located closer to the position sense electrode 21 to an end portion of the drive electrode 11 above the shield electrode 23 in a plan view. Similarly, W2 is a distance from an end portion of the shield electrode 23 located closer to the pressing force sense electrode 22 to the end portion of the drive electrode 11 above the shield electrode 23 in a plan view. Note that H is the distance in a case where the touch panel 1 is not pressed, and is also the thickness of the dielectric layer 30. In addition, in FIG. and the like, the electrodes 11, 21 to 23 each having an extremely great thickness are illustrated; however, each of the electrodes 11, 21 to 23 is actually extremely thin. Accordingly, H can be seen as she distance between she drive electrode 11 and she shield electrode 23.

The electrical lines of force generated from the pointer F and the various electrodes spread concentrically. Thus, in a case where W1≥H is satisfied, the drive electrode 11 can be effectively inhibited from being capacitively coupled with the position sense electrode 21 over the shield electrode 23 (see FIG. 4). Additionally, in a case where W2≥H is satisfied, the pointer F can be effectively inhibited from being capacitively coupled with the pressing force sense electrode 22 over the shield electrode 23 (see FIG. 5).

Second Embodiment

Next, a second embodiment will be described. Note that, in the following description, in a case where the same reference numerals as in the first embodiment are used, the same configuration as in the first embodiment is illustrated, and reference is made to the preceding description unless otherwise described.

Figure 7:
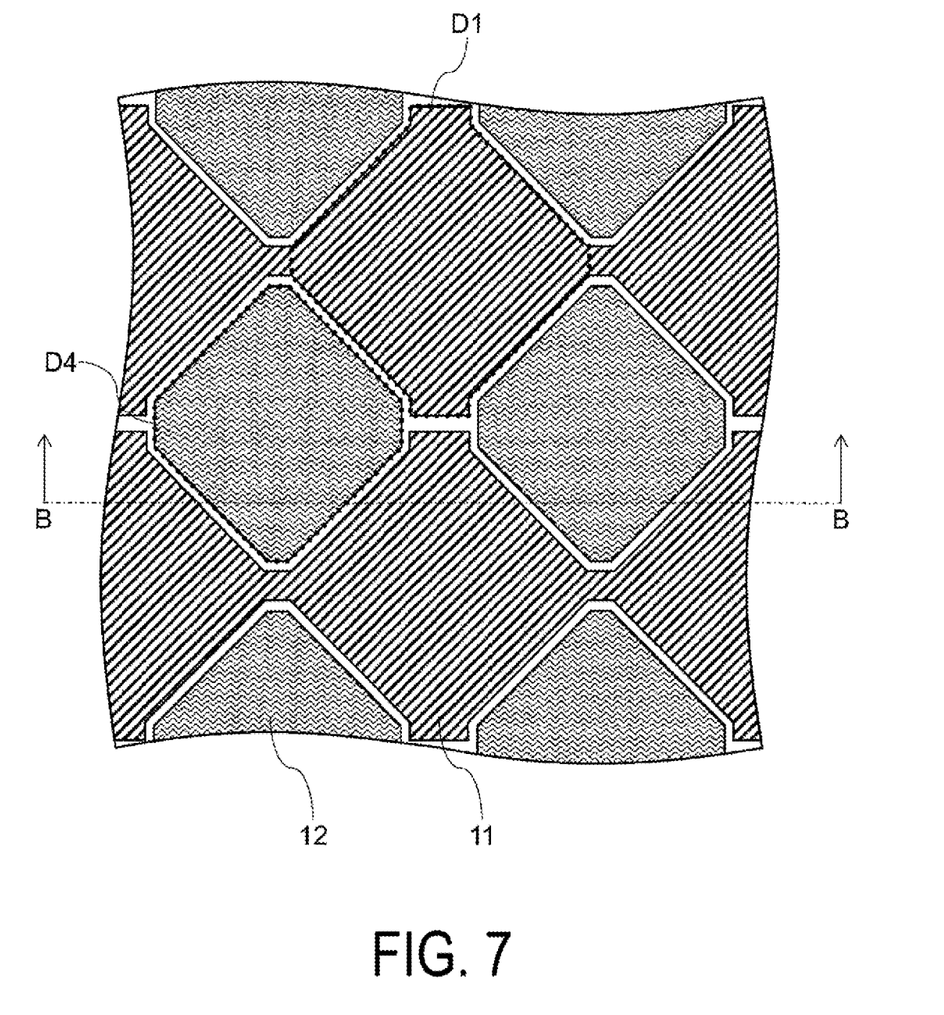
FIG. 7 is a plan view illustrating a configuration of as electrode included is a touch panel 1A according to a second embodiment.
Figure 8:
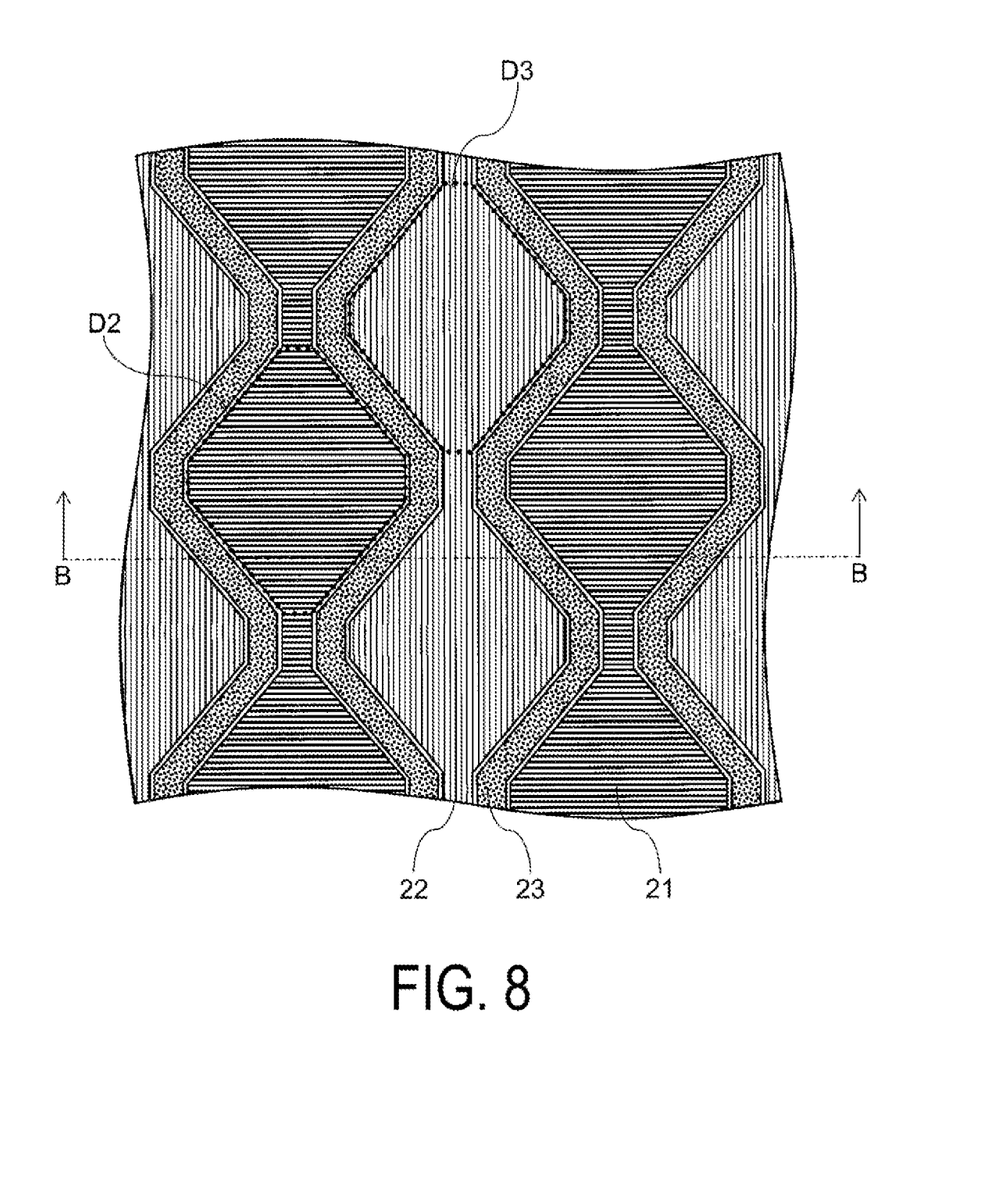
FIG. 8 is a plan view illustrating a configuration of an electrode included in the touch panel 1A according to the second embodiment.
Figure 9:
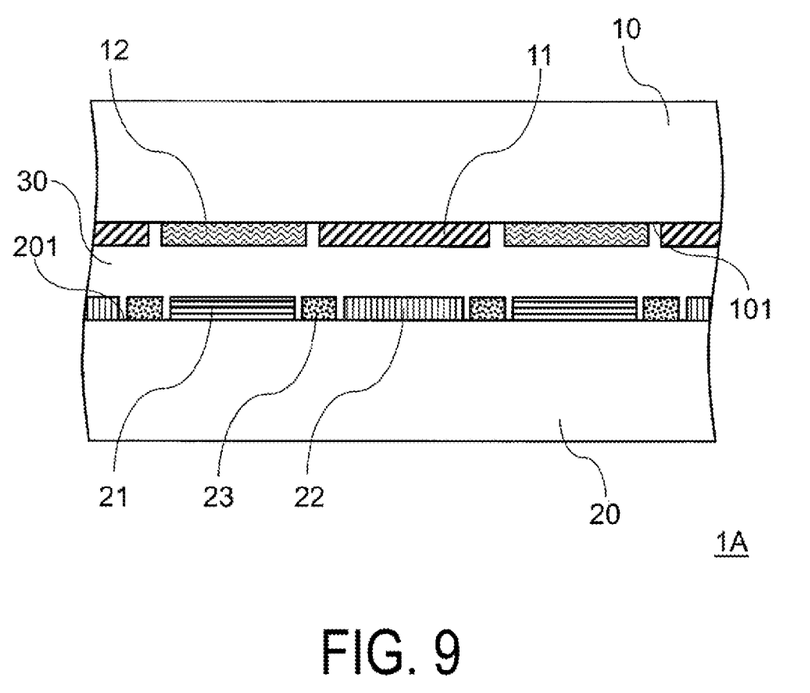
FIG. 9 is a cross-sectional view illustrating a cross section taken along a line B-B of FIGS. 7 and 8.

FIGS. 7 to 9 are views illustrating a schematic configuration of a touch panel 1A according to the second embodiment. FIGS. 7 and 8 are plan views illustrating configurations of electrodes included in the touch panel 1A according to the second embodiment. FIG. 9 is a cross-sectional view illustrating a cross section taken along a line B-B of FIGS. 7 and 8. Note that for the sake of convenience in illustration, the electrodes included in the touch panel 1A are illustrated separately in FIGS. 7 and 8; however, as illustrated in FIG. 9, the electrodes illustrated in FIGS. 7 and 8 are layered.

As illustrated in FIG. 9, similar to the touch panel 1 according to the first embodiment, the touch panel 1A includes the first substrate 10, the drive electrode 11, the second substrate 20, the position sense electrode 21, the pressing force sense electrode 22, the shield electrode 23, and the dielectric layer 30. Furthermore, the touch panel 1A includes a floating island electrode 12. The floating island electrode 12 is made of an electrically conductive transparent material such as ITO. The floating island electrode 12 is formed on the first surface 101 of the first substrate 10 and is in a floating state.

As illustrated in FIG. 7, the floating island electrode 12 includes a plurality of non-connected rhombus-shaped electrodes D4. In addition, in a plan view, the floating island electrode 12 covers at least a portion of the position sense electrode 21. Note that in the touch panel 1A exemplified in FIGS. 7 to 9, in a plan view, one rhombus-shaped electrode D4 constituting the floating island electrode 12 contains one rhombus-shaped electrode D2 constituting the position sense electrode 21.

Figure 10:
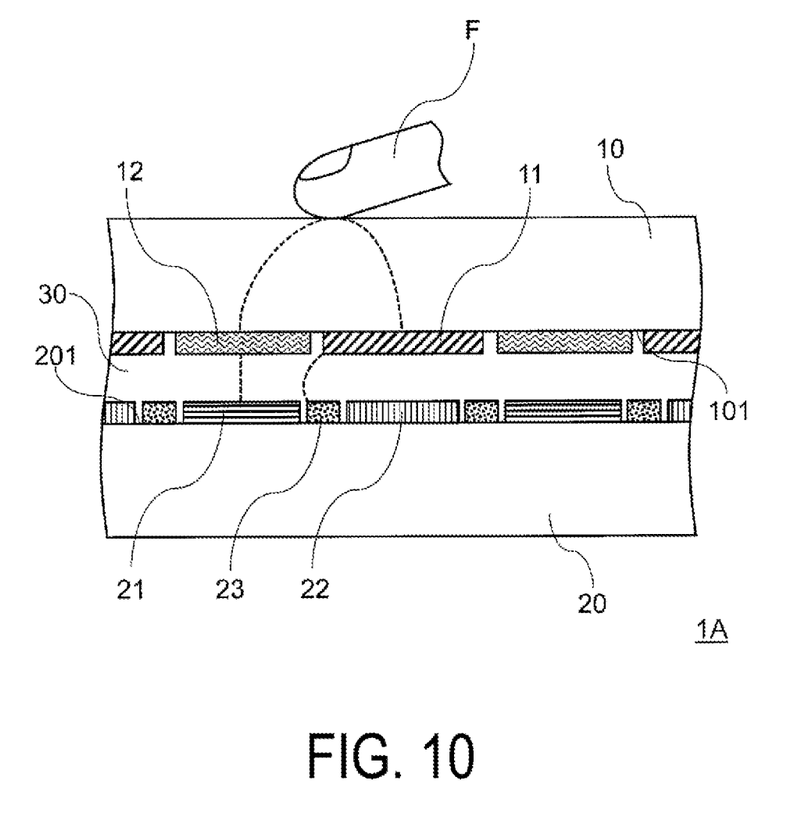
FIG. 10 is a cross-sectional view illustrating capacitive coupling with respect to the detection accuracy of the position sense electrode 21.
Figure 11:
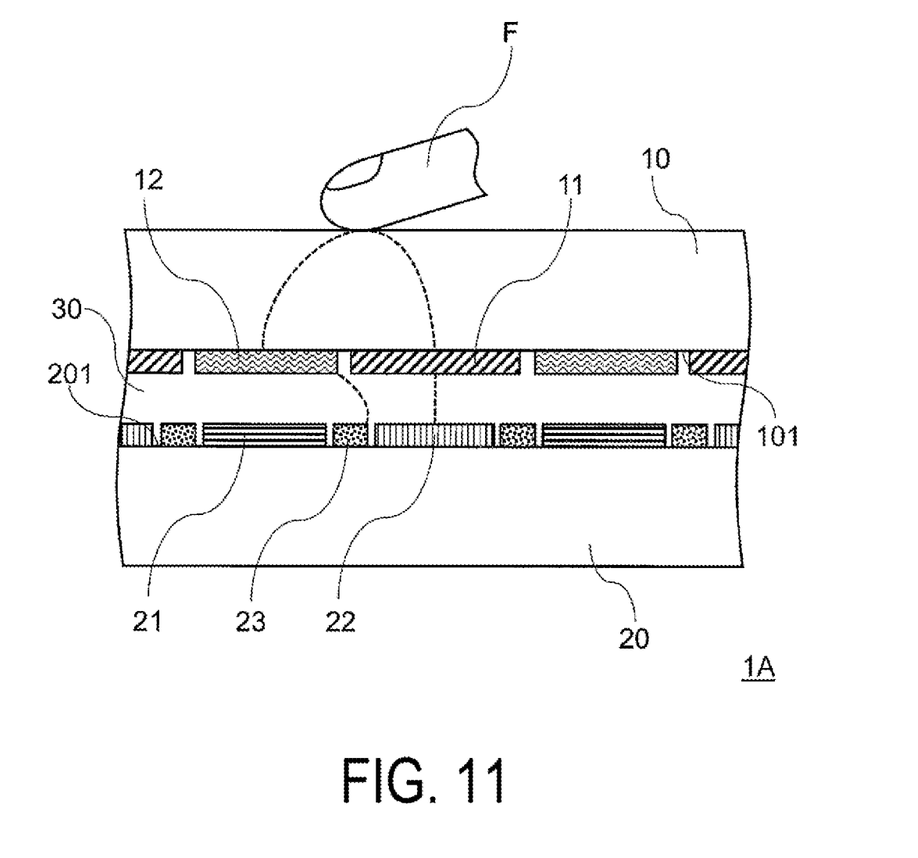
FIG. 11 is a cross-sectional view illustrating capacitive coupling with respect to the detection accuracy of the pressing force sense electrode 22.

Next, operation of the touch panel 1A will be described with reference to the drawings. FIG. 10 is a cross-sectional view illustrating capacitive coupling with respect to the detection accuracy of the position sense electrode 21. FIG. 11 is a cross-sectional view illustrating capacitive coupling with respect to the detection accuracy of the pressing force sense electrode 22. In FIGS. 10 and 11, electrical lines of force corresponding to capacitive coupling generated between the pointer F and the various electrodes and capacitive coupling generated between the various electrodes are indicated by dashed lines.

As illustrated in FIG. 10, the floating island electrode 12 is capacitively coupled with the position sense electrode 21. The pointer F is capacitively coupled with each of the drive electrode 11 and the floating island electrode 12 in response to the pointer F coming into contact with the surface of the substrate 10 located opposite the first surface 101. This results in a decrease in the electrostatic capacitance between the drive electrode 11 and the position sense electrode 21 due to the pointer F and the floating island electrode 12 and results in a change in a signal detected at the position sense electrode 21. This change in the signal allows the position of the pointer F to be detected.

At this time, the distance between the drive electrode 11 and she position sense electrode 21 is reduced in response to the pointer F pressing the first substrate 10. However, since drive electrode 11 is closer to the shield electrode 23 than the position sense electrode 21, the drive electrode 11 is likely to be capacitively coupled with the shield electrode 23. The position sense electrode 21 is also capacitively coupled with the floating island electrode 12. Therefore, even in a case where the pointer F presses the first substrate 10, the electrostatic capacitance between the drive electrode 11 and the position sense electrode 21 is less likely to increase, and a decrease in the electrostatic capacitance between both the electrodes 11 and 21 due to the pointer F is less likely to be cancelled out. Accordingly, the touch panel 1A can further accurately detect the position of the pointer F.

In addition, as illustrated in FIG. 11, the distance between the drive electrode 11 and the pressing force sense electrode 22 is reduced in response to the pointer F pressing the first substrate 10. This results in an increase in the electrostatic capacitance between both the electrodes 11 and 22 and results in a change in the signal detected at the pressing force sense electrode 22. This change in the signal allows the magnitude of the pressing force to be detected.

At this time, the pointer F is capacitively coupled with the floating island electrode 12 on the path from the pointer F to the pressing force sense electrode 22, and the floating island electrode 12 is closer to the shield electrode 23 than the pressing force sense electrode 22. Therefore, the floating island electrode 12 is more likely to be capacitively coupled with the shield electrode 23 than the pressing force sense electrode 22. The floating island electrode 12 is also capacitively coupled with the position sense electrode 21. This suppresses the pointer F from being capacitively coupled with the pressing force sense electrode 22 via the floating island electrode 12 and the electrostatic capacitance between the drive electrode 11 and the pressing force sense electrode 22 from fluctuating. Thus, the touch panel 1A can further accurately detect the amount of the pressing force.

As described above, the touch panel 1A includes the floating island electrode 12 in addition to the shield electrode 23, and this can further effectively inhibit the capacitive coupling that causes a decrease in the detection accuracy of the position of the pointer F and the magnitude of the pressing force. Accordingly, the touch panel 1A can further accurately detect the position of the pointer F and the magnitude of the pressing force.

Note that, as described with reference to FIG. 5 with respect to the first embodiment, a suitable size of the shield electrode 23 applies in the second embodiment as well. First, in a case where W1≥H is satisfied, the drive electrode 11 can be effectively inhibited from being capacitively coupled with the position sense electrode 21 over the shield electrode 23 (see FIG. 10). Additionally, in a case where W2≥H is satisfied, the floating island electrode 12 capacitively coupled with the pointer F can be effectively inhibited from being capacitively coupled with the pressing force sense electrode 22 over the shield electrode 23 (see FIG. 11).

Modified Example

The above-described embodiments are merely examples for carrying out the disclosure. Accordingly, the disclosure is not limited to the embodiments described above and can be carried out by appropriately modifying the embodiments described above without departing from the scope.

For example, in the first and second embodiments described above, an example is described in which each of the position sense electrode 21, the pressing force sense electrode 22, and the shield electrode 23 is formed of ITO. However, each of the pressing force sense electrode 22 and the shield electrode 23 may be formed of a mesh metal. Note that the mesh metal is a metal thin wire having a mesh shape.

Each of the pressing force sense electrode 22 and the shield electrode 23 is positioned directly below the drive electrode 11 in a plan view. This is likely to result in an increase in the coupling capacitance between each of the pressing force sense electrode 22 and the shield electrode 23 and the drive electrode 11. The greater the coupling capacitance, the greater the load when driving the touch panel 1, 1A, and thus, the drive frequency of the touch panel 1, 1A needs to be decreased.

Accordingly, as described above, in a case where the pressing force sense electrode 22 and the shield electrode 23 are formed of a mesh metal to reduce areas of both the electrodes 22 and 23, and thus, the coupling capacitance between the drive electrode 11 and both the electrodes 22 and 23 is decreased, the load when driving the touch panel 1, 1A can be reduced, and the drive frequency can be increased.

In addition, the position sense electrode 21 may also be formed of a mesh metal as well as the pressing force sense electrode 22 and the shield electrode 23. In this case, since all the electrodes 21 to 23 formed on the second surface 201 of the second substrate 20 are formed of a mesh metal, they can be formed at the same time. Accordingly, the manufacturing process of the touch panel 1, 1A can be simplified.

Further, for example, in the first and second embodiments described above, an example is described of each of the drive electrode 11, the position sense electrode 21, and the pressing force sense electrode 22 having a diamond pattern; however, these electrodes may have a different shape. For example, each of the drive electrode 11, the position sense electrode 21, and the pressing force sense electrode 22 may have a pattern having a uniform width. However, in a plan view, the drive electrode 11 covers at least a portion or the pressing force sense electrode 22, and at least a portion of an end portion of the drive electrode 11 is positioned above the shield electrode 23.

Figure 12:
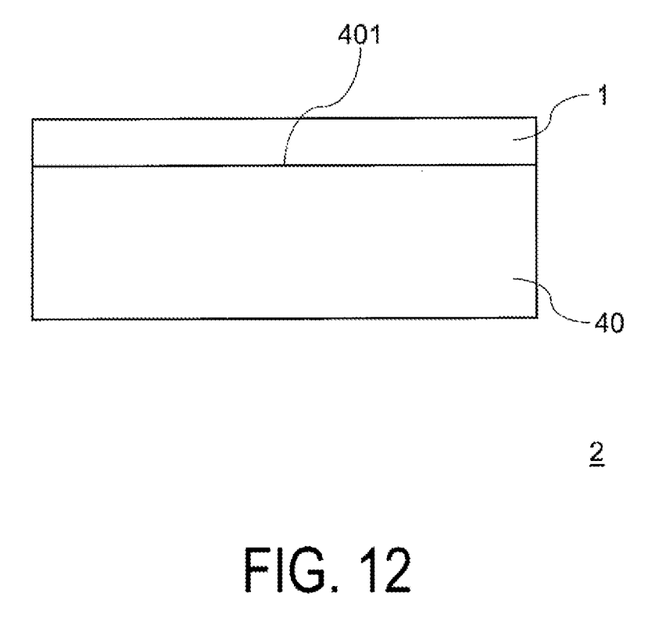
FIG. 12 is a cross-sectional view illustrating a configuration of a display device 2 including the touch panel 1.

The touch panel 1, 1A according to the and second embodiments described above can be mounted on a display device, for example. FIG. 12 is a cross-sectional view illustrating a configuration of a display device 2 including the touch panel 1. Note that FIG. 12 illustrates an example of the display device 2 including the touch panel 1 according to the first embodiment; however, the touch panel 1A according to she second embodiment can similarly be mounted on the display device 2.

As illustrated in FIG. 12, the display device 2 includes the touch panel 1 and a display unit 40 configured to display an image on a display surface 401. The display unit 40 may be configured by a liquid crystal display or an organic Electro Luminescence (EL) display, for example. The touch panel 1 is disposed on the display surface 401 of the display unit 40 such that the second substrate 20 is adjacent to the display unit 40.

The touch panel and the display device described above can be described as follows.

A touch panel includes a first substrate including a first surface, a second substrate including a second surface opposite to the first surface, drive electrode formed on the first surface, and a position sense electrode, a pressing force sense electrode, and a shield electrode that are formed on the second surface. The shield electrode disposed between the position sense electrode and the pressing force sense electrode. In a plan view when viewing the second substrate from the first substrate, the drive electrode covers at least a portion of the pressing force sense electrode, and at least a portion of an end portion of the drive electrode is positioned above the shield electrode (first configuration). According to this configuration, the touch panel includes the shield electrode, and the shield electrode can inhibit the capacitive coupling that causes a decrease in the detection accuracy of the position of the pointer and the magnitude of the pressing force. Accordingly, the touch panel can accurately detect the position of the pointer and the magnitude of the pressing force.

In the first configuration, a potential of the shield electrode may be equal to the ground potential or a potential provided to the position sense electrode or the pressing force sense electrode (second configuration). This configuration can increase the effect of the shield electrode inhibiting the capacitive coupling described above.

In the first or second configuration, W1≥H may be satisfied, where H is an interval between the first surface and the second surface, and W1 is a distance from an end portion of the shield electrode located closer to the position sense electrode to an end portion of the drive electrode above the shield electrode in a plan view when viewing the second substrate from the first substrate (third configuration). This configuration can effectively inhibit the drive electrode from being capacitively coupled with the position sense electrode over the shield electrode.

In any one of the first to third configurations, W2≥H may be satisfied, where H is an interval between the first surface and the second surface, and W2 is a distance from an end portion of the shield electrode located closer to the pressing force sense electrode to an end portion of the drive electrode above the shield electrode in a plan view when viewing the second substrate from the first substrate (fourth configuration). This configuration can effectively inhibit the pointer from being capacitively coupled with the pressing force sense electrode over the shield electrode.

In any one of the first to fourth configurations, the pressing force sense electrode and the shield electrode may be formed of a mesh metal (fifth configuration). This configuration allows the load when driving the touch panel to be reduced and the drive frequency to be increased.

In the fifth configuration, the position sense electrode may be formed of a mesh metal (sixth configuration). This configuration allows the electrodes formed on the second surface of the second substrate to be formed at the same time since all the electrodes are formed of a mesh metal. Thus, this configuration allows the manufacturing process of the touch panel to be simplified.

In any one of the first to sixth configurations, the touch panel further includes a floating island electrode in a floating state formed on the first surface, and in a plan view when viewing the second substrate from the first substrate, the floating island electrode may cover at least a portion of the position sense electrode (seventh configuration). This configuration can further effectively inhibit the capacitive coupling that causes a decrease in the detection accuracy of the position of the pointer and the magnitude of the pressing force since the touch panel includes the floating island electrode in addition to the shield electrode. Accordingly, this configuration allows the position of the pointer and the magnitude of the pressing force to be further accurately detected.

Another embodiment of the disclosure is a display device including the touch panel according to any one of the first to seventh configurations and a display unit configured to display an image. The touch panel is disposed on a display surface on which the display unit displays an image (eighth configuration).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A touch panel comprising:
a first substrate including a first surface;
a second substrate including a second surface opposite to the first surface;
a drive electrode formed on the first surface; and
a position sense electrode, a pressing force sense electrode, and a shield electrode that are formed on the second surface,
wherein the shield electrode is disposed between the position sense electrode and the pressing force sense electrode, and
in a plan view when viewing the second substrate from the first substrate, the drive electrode covers at least a portion of the pressing force sense electrode, and at least a portion of an end portion of the drive electrode is positioned above the shield electrode,
wherein W1≥H is satisfied,
where H is an interval between the first surface and the second surface, and
W1 is a distance from an end portion of the shield electrode located closer to the position sense electrode to an end portion of the drive electrode above the shield electrode in a plan view when viewing the second substrate from the first substrate.

2. The touch panel according to claim 1,
wherein a potential of the shield electrode is equal to the ground potential or a potential provided to the position sense electrode or the pressing force sense electrode.

3. The touch panel according to claim 1,
wherein the pressing force sense electrode and the shield electrode are formed of a mesh metal.

4. The touch panel according to claim 3,
wherein the position sense electrode is formed of a mesh metal.

5. The touch panel according to claim 1 further comprising:
a floating island electrode in a floating state formed on the first surface,
wherein in a plan view when viewing the second substrate from the first substrate, the floating island electrode covers at least a portion of the position sense electrode.

6. A display device comprising:
the touch panel according to claim 1; and
a display unit configured to display an image,
wherein the touch panel is disposed on a display surface on which the display unit displays an image.

7. A touch panel comprising:
a first substrate including a first surface;
a second substrate including a second surface opposite to the first surface;
a drive electrode formed on the first surface; and
a position sense electrode, a pressing force sense electrode, and a shield electrode that are formed on the second surface,
wherein the shield electrode is disposed between the position sense electrode and the pressing force sense electrode, and
in a plan view when viewing the second substrate from the first substrate, the drive electrode covers at least a portion of the pressing force sense electrode, and at least a portion of an end portion of the drive electrode is positioned above the shield electrode,
wherein W2≥H is satisfied,
where H is an interval between the first surface and the second surface, and
W2 is a distance from an end portion of the shield electrode located closer to the pressing force sense electrode to an end portion of the drive electrode above the shield electrode in a plan view when viewing the second substrate from the first substrate.

8. The touch panel according to claim 7,
wherein a potential of the shield electrode is equal to the ground potential or a potential provided to the position sense electrode or the pressing force sense electrode.

9. The touch panel according to claim 7,
wherein the pressing force sense electrode and the shield electrode are formed of a mesh metal.

10. The touch panel according to claim 9,
wherein the position sense electrode is formed of a mesh metal.

11. The touch panel according to claim 7 further comprising:
a floating island electrode in a floating state formed on the first surface,
wherein in a plan view when viewing the second substrate from the first substrate, the floating island electrode covers at least a portion of the position sense electrode.

12. A display device comprising:
the touch panel according to claim 7; and
a display unit configured to display an image,
wherein the touch panel is disposed on a display surface on which the display unit displays an image.

* * * * *